(12) United States Patent
Hillenbrand et al.

(10) Patent No.: US 6,474,185 B2
(45) Date of Patent: Nov. 5, 2002

(54) METHOD FOR CONTROLLING A GEAR UNIT OF A MOTOR VEHICLE HAVING SYNCHRONIZING DEVICES

(75) Inventors: Werner Hillenbrand, Neuffen (DE); Frank Schleicher, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 19 days.

(21) Appl. No.: 09/759,133

(22) Filed: Jan. 16, 2001

(65) Prior Publication Data

US 2001/0032523 A1 Oct. 25, 2001

(30) Foreign Application Priority Data

Jan. 15, 2000 (DE) .......................................... 100 01 486

(51) Int. Cl.$^7$ ............................................. F16H 63/00
(52) U.S. Cl. ......................... 74/335; 477/109; 477/124; 701/55
(58) Field of Search ............................... 74/335, 336 R, 74/339; 477/78, 90, 107, 109, 123, 124; 701/54, 55, 56, 64

(56) References Cited

U.S. PATENT DOCUMENTS

| | | | | |
|---|---|---|---|---|
| 5,010,490 A | * | 4/1991 | Naito et al. | 701/110 |
| 5,199,312 A | * | 4/1993 | Higgins et al. | 74/335 |
| 5,875,679 A | * | 3/1999 | Salecker et al. | 74/335 |
| 5,910,068 A | | 6/1999 | Krauss et al. | 477/109 |
| 6,170,623 B1 | * | 1/2001 | Eismann et al. | 192/3.55 |

FOREIGN PATENT DOCUMENTS

DE 19526 273 A1 1/1997

* cited by examiner

*Primary Examiner*—Pam Rodriguez
(74) *Attorney, Agent, or Firm*—Crowell & Moring LLP

(57) ABSTRACT

A method for controlling a gear unit of a motor vehicle having synchronizing devices. When an actuating device of a synchronizing device is controlled in terms of force or travel, strongly differing wear behavior occurs depending on use. The inclination of the travel path or the shifting frequency is detected during operation of the motor vehicle and a characteristic diagram is used in order to adapt the shifting force to the information item obtained.

13 Claims, 2 Drawing Sheets

METHOD FOR CONTROLLING A GEAR UNIT OF A MOTOR VEHICLE HAVING SYNCHRONIZING DEVICES

BACKGROUND AND SUMMARY OF INVENTION

This application claims the priority of German Patent Document 100 01 486.0, filed Jan. 15, 2000, the disclosure of which is expressly incorporated by reference herein.

The present invention relates to a method for controlling a gear unit of a motor vehicle having synchronizing devices.

German Reference DE 195 26 273 A1 discloses a gear mechanism which has synchronizing devices and in which the actuating path x of the synchronizing device is fed as operating signal to a control device. Information from the shifted gear step and the gear step to be shifted, is provided as a further operating signal to the control device from which the expected speed differential is determined. A shifting force is determined from a characteristic diagram as a function of the actuating path x and the speed differential, and adapted in the course of the synchronization operation.

Because of wear in the region of friction surfaces on the synchronizing device as the operating period of the synchronizing device increases, the operating point is displaced. Therefore, the use of the actuating path x is affected by error. Furthermore, it becomes clear that the service life of the synchronizing device is a function of the use of the motor vehicle. In particular, depending on use, some gear units experience mechanical impairments in the region of the friction surfaces, which can lead to impairment of the driving and/or shifting comfort, going as far as component failure, while other gear units exhibit no such impairments.

It is therefore the object of the present invention to propose a method for controlling a gear unit which ensures the functionality of the gear unit over a prescribed service life.

It has been found that the number of shifting events for the same kilometer reading differs for different motor vehicles. With a rising number of shifting events, there is a rise in the loading of the synchronizing device and a lowering of its service life. It is possible to determine a shifting frequency from an evaluation over an operating period. For example, the number of shifting events is determined over a prescribed distance or from the manufacture of the vehicle. It is also possible to evaluate the shifting events statistically. For example, as regards the operating period, it is possible to make an evaluation over a comparatively short operating period or a fixed driving distance or since the most recent beginning of a journey. This evaluation provides information, for example, on the heat budget of the synchronizing device, with the possibility of taking into account the information obtained for a favorable characteristic of the control signal and/or the shifting force. Alternatively, or in addition, the evaluation can be performed over a long operating period or a long driving distance, in particular from the manufacture of the vehicle. This evaluation provides information, in particular, on the state of the synchronizing device or the wear thereof.

If severe loading of the synchronizing device is indicated by the evaluation, the characteristic of the controlled variable, as well as the latter the characteristic of the shifting force can be suitably adapted. For example, given an indicated severe loading of the synchronizing device, the build-up of the shifting force can be slowed down, in particular within specific synchronizing phases, or its maximum can be limited.

According to another embodiment of the present invention, It has been found that the current inclination of the travel path influences the frictional conditions of the synchronizing device. For example, given comparable driving conditions, the torques to be picked up and transmitted by the synchronization device are different for an uphill roadway and a downhill roadway. These changed power conditions can be taken into account in accordance with a determined inclination when influence is exerted on the controlled variable. Consequently, larger shifting forces can be required given a uphill roadway, for example, in conjunction with the same period of a synchronization phase.

According to the present invention, the switching forces can be fashioned such that they always remain below the permissible continuous critical loads in conjunction with shifting times which are optimum for the respective driving situation.

Alternatively or in addition to the absolute value of the switching force produced, the control signal can be influenced to vary or adapt the characteristic of the build-up of the shifting force, in particular the period of the synchronization process.

The control signal is preferably determined taking account of the shifting events, in particular the shifting frequency, and the inclination of the roadway in order to obtain all of the abovementioned advantages.

In accordance with a further embodiment of the present invention, a control signal is determined within a (synchronization) phase, in particular the phase of the initial synchronization, the turning of the synchronization ring, the synchronization, the blocking, the turning back of (synchronization) phase, in particular the phase of the initial synchronization, the turning of the synchronization ring, the synchronization, the blocking, the turning back of the synchronization ring, the turning of the coupling body and/or the making of a self-closed connection. In particular, the determination is performed within Phase I until the synchronization point is reached, from the end of Phase I in a Phase II until the synchronization speed of the gearwheel with the assigned shaft has been reached and/or from the end of Phase II in a Phase III until the synchronization device ceases to be actuated.

The control signal is determined within at least one of these phases via a functional dependence which takes account the temporal sequence of the shifting events, their number or frequency and/or the topography of the travel path, in particular the inclination thereof. It is thereby possible to take specific account of the requirements placed on the shifting force in the individual synchronization phases of the synchronizing device.

The functional dependence can take any of several desirable forms. For example one form could be a function dependent on one of the parameters. Alternatively, evaluation is possible by means of a (multidimensional) characteristic diagram which specifies the control signal, the shifting force at discrete points or in ranges for the temporal sequence of the shifting events, their number or frequency and/or the inclination of the travel path.

Alternatively or in addition to the absolute (desired) value of the control signal, or an additional functional dependence can be used in order to describe an information item on the characteristic, in particular a rate of change (gradient) of the control signal.

Other objects, advantages and novel features of the present invention will become apparent from the following detailed description of the invention when considered in conjunction with the accompanying drawings.

DETAILED DESCRIPTION OF THE DRAWINGS

Figure 1:
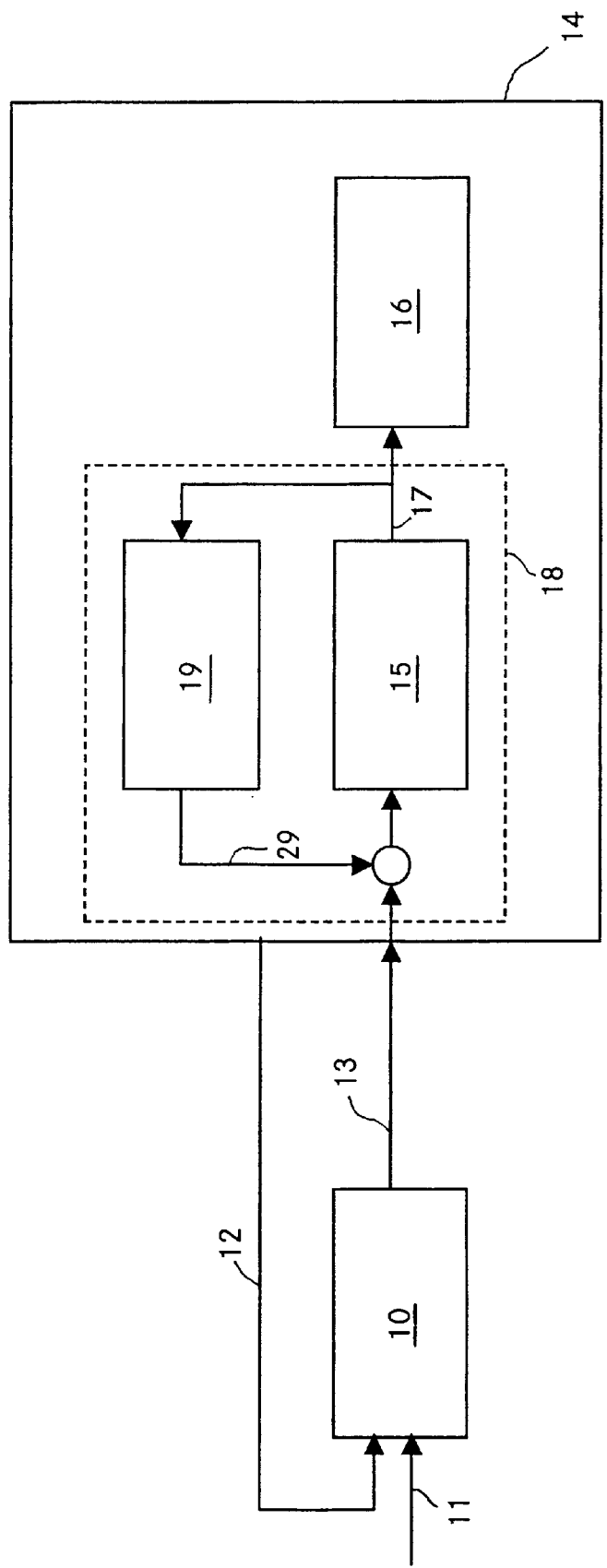
FIG. 1 shows a block diagram relating to the signal flow for a method according to the present invention.

A control device 10 is fed input variables 11, 12. A control signal 13, which is fed to a synchronizing device 14, is determined in the control device 10. The synchronizing device 14 has an actuating device 15, which acts on the actuating members 16, in particular a synchronizing ring, a mating surface of a gearwheel to be switched and a movable sliding sleeve in order to achieve the release of a friction-closed, self-closed and/or friction- and self-closed connection. The output variable(s) 17 of the actuating device 15, in particular a shifting force and/or a shifting travel, are controlled in a controller 18 with feedback of the output variable(s) 17, the control signal 13 forming, for example, a desired signal or a reference variable for the output variable (s) 17, in particular the shifting force, and the control strategy and controlling elements 19 being adapted to the requirements of the synchronizing device 14, the selected samples in the case of discrete signals, and the duration of the synchronization process.

The control device 10 is designed, for example, as a (micro)processor. The control device 10 can be designed as a separate component, at an integral constituent of a gear unit and/or as constituents of a further control device or of a controller or the controller 18.

The input variables 11 are, for example, operating signals, in particular the selected gear step, an engine signal such as a throttle angle or a drive torque, the occurrence of a shifting event or a shifting pulse from the driver, a driver's wish, the current inclination of the travel path, a position of the accelerator or brake pedal, the sum of all the driving resistances, or the like. The input variables 12 are operating variables of the synchronizing device 14 or of the actuating device 15, for example absolute values or current change values (gradients) of the pressure (of a hydraulic cylinder), a shifting force, an actuator travel x, a differential speed $\Delta n$ or a temperature signal of the synchronizing device 14.

The input signals 11, 12 are processed in the control device 10. For example, at least one engine signal for determining the current driving resistance, drive torque or the inclination of the roadway can be processed in a way known per se, in particular via functional relationships or characteristic diagrams. The current values of the input signals 11, 12, or of parameters determined from the latter, are denoted below as operating values. For example, the selected gear step G, the inclination s of the travel path, the shifting frequency H and the differential speed $\Delta n$ are termed operating variables, as is the synchronization phase P (corresponding to the abovenamed Phases I, II and III). The use of alternative or additional operating values is possible by analogy. The control signal 13 or a current value of the same is calculated from the operating values in accordance with a characteristic diagram during Phases I, II and III. The control signal is preferably the desired value of an internal pressure of a (hydraulic) cylinder of the actuating device 15.

Figure 2:
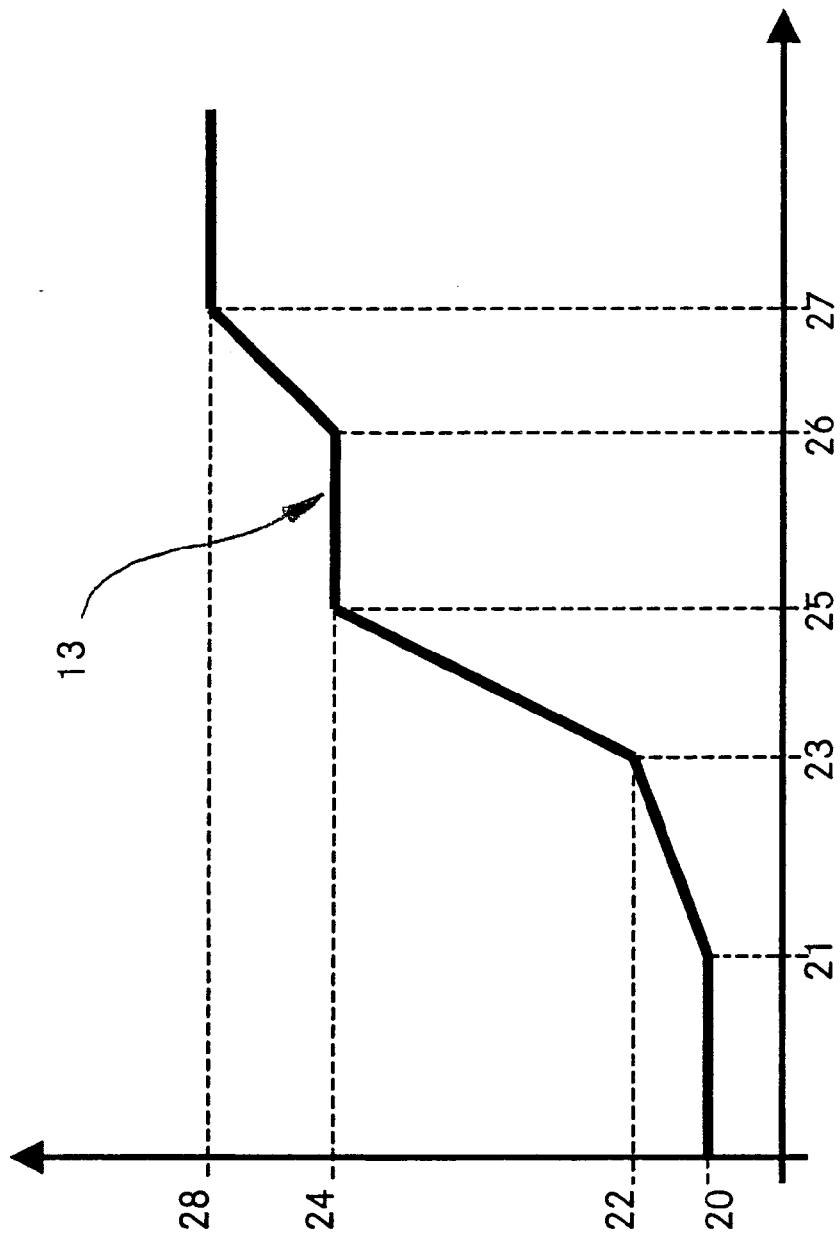
FIG. 2 shows a control signal.

FIG. 2 shows an example of the characteristic of a control signal 13 as a function of time. Phase I exhibits a linear rise in the control signal 13 from a basic value 20 at the instant 21 of the inception of the synchronizing process up to the maximum value 22 at the instant 23 of reaching the synchronous point.

As Phase II starts to set in immediately after Phase I, there is a change in the gradient of the control signal 13, in particular the latter becomes larger. The transition of the control signal 13 from Phase I to Phase II is preferably continuous, but not differentiable. When a maximum value 24 is reached at the instant 25, the control signal 13 remains constant up to the instant 26 of the end of Phase II and corresponds to the maximum value 24. If the end of Phase II is reached before the maximum value 24 is reached, there is no region 25–26.

As Phase III starts to set in immediately after Phase II, there is a change, in particular a rise, in the gradient of the control signal 13 up to the instant 27 of the end of the synchronizing process, at which the maximum value 28 is reached. The transition is preferably continuous, but not differentiable.

In a deviation from the illustrated characteristic of the control signal 13, the latter can exhibit any desired profile (with or without at least one discontinuity).

The control signal 13 is determined as follows from the operating values in the control device 10:

During a Phase I, the gradient of a change in pressure of the actuating device 15 is read out or determined in the unit [bar/s] in the form of the parameters $a_i$ from the characteristic diagram I with the operating values of gear step, inclination and shifting frequency. The shifting frequencies are divided into three classes by way of example in the characteristic diagram I, the shifting class to be applied being determined by the result of the evaluation of the shifting events, that is to say, in particular, their temporal sequence or number within an operating segment or an operating period. The parameter $a_i$ which can be determined from the characteristic map is correlated with the gradient of the control signal 13 during Phase I, such that the characteristic of the control signal 13 can be determined from the parameter. The parameter $a_i$ is correlated with the quotient of the difference (value 22–value 20) and the difference (instant 23–instant 21). The end of Phase I can, for example, be determined by detecting when the synchronous point is reached, or is yielded upon expiry of a prescribed time.

During Phase I, therefore, the power does not build up suddenly, and this prevents loss of comfort for the driver.

| Characteristic diagram I | | | | | | | |
|---|---|---|---|---|---|---|---|
| Class of shifting | Inclination | Gear step | | | | | |
| frequency | [%] | 1 | 2 | 3 | 4 | 5 | 6 |
| A | −15 to −5 | $a_1$ | $a_2$ | $a_3$ | $a_4$ | $a_5$ | $a_6$ |
|   | −5 to +5 | $a_7$ | $a_8$ | $a_9$ | $a_{10}$ | $a_{11}$ | $a_{12}$ |
|   | +5 to +15 | $a_{13}$ | $a_{14}$ | $a_{15}$ | $a_{16}$ | $a_{17}$ | $a_{18}$ |
| B | −15 to −5 | $a_{19}$ | $a_{20}$ | $a_{21}$ | $a_{22}$ | $a_{23}$ | $a_{24}$ |
|   | −5 to +5 | $a_{25}$ | $a_{26}$ | $a_{27}$ | $a_{228}$ | $a_{29}$ | $a_{30}$ |
|   | +5 to +15 | $a_{31}$ | $a_{32}$ | $a_{33}$ | $a_{34}$ | $a_{35}$ | $a_{36}$ |
| C | −15 to −5 | $a_{37}$ | $a_{38}$ | $a_{39}$ | $a_{40}$ | $a_{41}$ | $a_{42}$ |
|   | −5 to +5 | $a_{43}$ | $a_{44}$ | $a_{45}$ | $a_{46}$ | $a_{47}$ | $a_{46}$ |
|   | +5 to +15 | $a_{49}$ | $a_{50}$ | $a_{51}$ | $a_{52}$ | $a_{53}$ | $a_{54}$ |

During Phase II, a parameter $b_i$ [bar/min] is determined, for example, from the characteristic diagram II. The control signal 13 is yielded via the parameter $b_i$ in accordance with control signal=$b_i/\Delta n$. This can result in an approximately linear, parabolic, hyperbolic or curved characteristic of the control signal 13.

Furthermore, the parameter $c_i$ [bar] is determined from the characteristic diagram, being correlated with the maximum value 24 of the control signal. If the control signal 13 reaches the maximum value 24, the control signal is set at the constant value of $c_i$.

| Characteristic diagram II | | | | | | |
|---|---|---|---|---|---|---|
| | Gear step | | | | | |
| Inclination [%] | 1 | 2 | 3 | 4 | 5 | 6 |
| −15 to −5 | $b_1$ | $b_2$ | $b_3$ | $b_4$ | $b_5$ | $b_6$ |
| | $c_1$ | $c_2$ | $c_3$ | $c_4$ | $c_5$ | $c_6$ |
| −5 to +5 | $b_7$ | $b_8$ | $b_9$ | $b_{10}$ | $b_{11}$ | $b_{12}$ |
| | $c_7$ | $c_8$ | $c_9$ | $c_{10}$ | $c_{11}$ | $c_{12}$ |
| +5 to +15 | $b_{13}$ | $b_{14}$ | $b_{15}$ | $b_{16}$ | $b_{17}$ | $b_{18}$ |
| | $c_{13}$ | $c_{14}$ | $c_{15}$ | $c_{16}$ | $c_{17}$ | $c_{18}$ |

The control signal 13 is determined during Phase III by analogy with Phase I and/or Phase II.

There can be further characteristic diagrams, for example for operating instants of a moving-off process from v=0, or shifting out of a neutral position for v>0.

The subdivision of a characteristic diagram can be selected to be finer, or there can be a functional dependence of further operating values. Different characteristic diagrams are also possible for shifting up and shifting down.

The design of the parameters of the characteristic diagrams, in particular the parameters $a_i$, $b_i$, $c_i$, is performed in an a-priori fashion or by using a learning or adapting process during operation of the motor vehicle. Individual parameters can be prescribed by design, for example as a consequence of maximum permissible compressive load per unit area of the synchronizing device 14, or permissible loadings of individual components of the latter, or the speed differences to be expected as a consequence of the gearbox spacing or the drive power.

The change from one phase of the synchronizing process to another is detected by sensing the actuating path or the (differential) speed.

As an alternative to the characteristic diagrams illustrated, the current value of the control signal can be determined via at least one function:

Control signal=f (inclination, $\Delta n$, shifting frequency, gear step, . . . ).

The control signal 13 determined in such a way is fed (with a suitable fed-back correction value 29) to the regulator 18 of the actuating device. In particular, the internal pressure of, for example, a hydraulic or pneumatic actuating cylinder is regulated in accordance with the control signal.

Any desired synchronizing devices which can be actuated via an actuating device 15 can be used as synchronizing device 14. For example, the synchronization can be performed with the aid of a synchronizing member permanently connected to the transmission shaft, and of a synchronizing ring which is guided in the synchronizing member, can be displaced axially with respect to the synchronizing member, and is connected to the synchronizing member such that it can be rotated radially by a defined absolute value. A coupling member with shift toothing and a friction cone is assigned to the gearwheel to be shifted. When a shifting sleeve is actuated by exerting a shifting force thereon, the synchronizing ring comes to bear, in the region of a mating cone of the synchronizing ring, against the friction cone for the purpose of transmitting a synchronizing torque. This entails a change in the differential speed between the coupling member and synchronizing ring. In addition to the transmission of force via the mating cone, in a further shifting phase, force is transmitted via inner toothing of the shifting sleeve to outer toothing of the synchronizing ring. In further shifting phases, the synchronizing ring is rotated, as is the coupling member in order to produce a self-closed connection between the transmission shaft and the gearwheel to be shifted with the aid of the shifting sleeve. The actuating device 15 therefore acts on actuating members 16 of the synchronizing device 14, in particular the shifting sleeve or the synchronizing ring, in order to exert force or to achieve a displacement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a gear unit of a motor vehicle having at least one pair of gear wheels permanently engaged with one another, a synchronizing device operationally connected to one of the gear wheels and to a transmission shaft arranged rotatably with respect to said one gear wheel wherein, upon actuation a rotationally fixed connection is made or released between said one gear wheel and the transmission shaft, said motor vehicle having at least one actuating device assigned to the synchronizing device for producing shifting forces between said one gear wheel and the transmission shaft and a control device for controlling at least one of the actuating device and the synchronizing device, said method comprising the steps of:

storing a plurality of shifting events in said control device;

providing said control device with at least one input signal;

generating, in said control device, a control signal determined as a function of a synchronizing phase of the synchronizing device and as a function of said at least one input signal wherein at least one operating value, or a class is determined in said control device from one of the number of shifting events over an operating period and the temporal sequence of the shifting events and wherein the control signal is determined as a function of the determined operating value or the class;

producing a shifting force in the actuating device as determined by the control signal.

2. A method according to claim 1, wherein said at least one control signal is determined as a function of the current inclination of the travel path of the motor vehicle.

3. A method according to claim 1, wherein said at least one control signal is regulated in accordance with a first functional dependence from the start of the actuation of the synchronizing device until a synchronous point is reached, the first functional dependence taking account of at least one of the temporal sequence of the shifting events, their frequency and the topography of the travel path of the motor vehicle.

4. A method according to claim 3, wherein said at least one control signal is regulated in accordance with a second functional dependence from when the synchronous point is reached until a synchronous rotational speed of said one gear wheel and an assigned shaft is reached, the second functional dependence taking into account at least one of the temporal sequence of the shifting events, their frequency and the topography of the travel path of the motor vehicle.

5. A method according to claim 4, wherein said at least one control signal is regulated in accordance with a third functional dependence from when the synchronous speed of said one gears wheel and the assigned shaft is reached until the end of the actuation of the synchronizing device, the third functional dependence taking into account at least one of the temporal sequence of the shifting events, their frequency and the topography of the travel path of the motor vehicle.

6. A method according to claim 5, wherein at least one of the first functional dependence, the second functional dependence and the third functional dependence take account of the selected gear step.

7. A method according to claim 5, wherein at least one of the first functional dependence, the second functional dependence and the third functional dependence are stored as a characteristic diagram of operating values in the control device with, the operating values being a function of at least one of the selected gear step, the shifting frequency, the shifting direction and/or the topography of the travel path.

8. A method according to claim 7, wherein an output value of the characteristic diagram after reaching said synchroniser point corresponds to a rate of pressure rise for an actuating cylinder of said at least one actuating device.

9. A method according to claim 7, wherein the characteristic diagram has several output values, a first output value being corrected with a rate of pressure rise for an actuating cylinder of an actuating device, and a second output value corresponding to a maximum value for the pressure in an actuating cylinder of said at least one actuating device.

10. A method according to claim 7, wherein said at least one control signal corresponds at least in a subregion to the quotient of an output value of a characteristic diagram (parameters $a_i$, $b_i$, $c_i$) and a differential speed ($\Delta n$).

11. A method according to claim 1, wherein said at least one control signal has a piecewise linear characteristic.

12. A method according to claim 1, wherein said at least one control signal has a continuous characteristic.

13. A method for controlling a gear unit of a motor vehicle having at least one pair of gear wheels permanently engaged with one another, a synchronizing device operationally connected to one of the gear wheels and to a transmission shaft arranged rotatably with respect to said one gear wheel wherein, upon actuation a rotationally fixed connection is made or released between said one gear wheel and the transmission shaft, said motor vehicle having at least one actuating device assigned to the synchronizing device for producing shifting forces between said one gear wheel and the transmission shaft and a control device for controlling at least one of the actuating device and the synchronizing device, said method comprising the steps of:

provide said control device with at least one input signal;

generating, in said control device, a control signal determined as a function of a synchronizing phase of the synchronizing device and as a function of said at least one input signal wherein said at least one input signal contains an information item concerning the inclination of the travel path of the motor vehicle and wherein the control signal is determined as a function of the current inclination of the travel path of the motor vehicle;

producing a shifting force in the actuating device as determined by said at least one control signal.

* * * * *